United States Patent [19]
Painter

[11] Patent Number: 5,404,253
[45] Date of Patent: Apr. 4, 1995

[54] ESTIMATOR-BASED RUNOUT COMPENSATION IN A DISK DRIVE

[75] Inventor: Christopher L. Painter, Boulder, Colo.

[73] Assignee: Fujitsu Limited, Kanagawa, Japan

[21] Appl. No.: 81,635

[22] Filed: Jun. 24, 1993

[51] Int. Cl.⁶ .............................................. G11B 5/596
[52] U.S. Cl. .................. 360/77.04; 360/78.09
[58] Field of Search ............. 360/77.04, 78.09, 77.08, 360/77.07, 78.04, 78.14

[56] References Cited

U.S. PATENT DOCUMENTS

| | | | |
|---|---|---|---|
| 4,536,809 | 8/1985 | Sidman | 360/77.04 |
| 4,616,276 | 10/1986 | Workman | 360/77.04 |
| 4,679,103 | 7/1987 | Workman | 360/78.14 X |
| 4,969,059 | 11/1990 | Volz et al. | 360/77.04 X |

*Primary Examiner*—W. R. Young
*Assistant Examiner*—James T. Wilson
*Attorney, Agent, or Firm*—Curtis, Morris & Safford

[57] ABSTRACT

In a disk drive controller, a head position servo compensates for repetitive runout disturbances arising from displacement of the center of the concentric data storage tracks from the axis of rotation of the disk. An estimator model is provided which includes first and second runout parameters for emulating the sinusoidal runout disturbance at a period that is the same as the rotational period of the disk. The runout parameter values generated from the model are stored in a reference table and used during read/write operations to adjust compensator-generated command signals in order to compensate for repetitive runout. Alternatively, an estimator including the runout parameters is operated in real time to provide estimated state signals as feedback signals for the servo system.

32 Claims, 7 Drawing Sheets

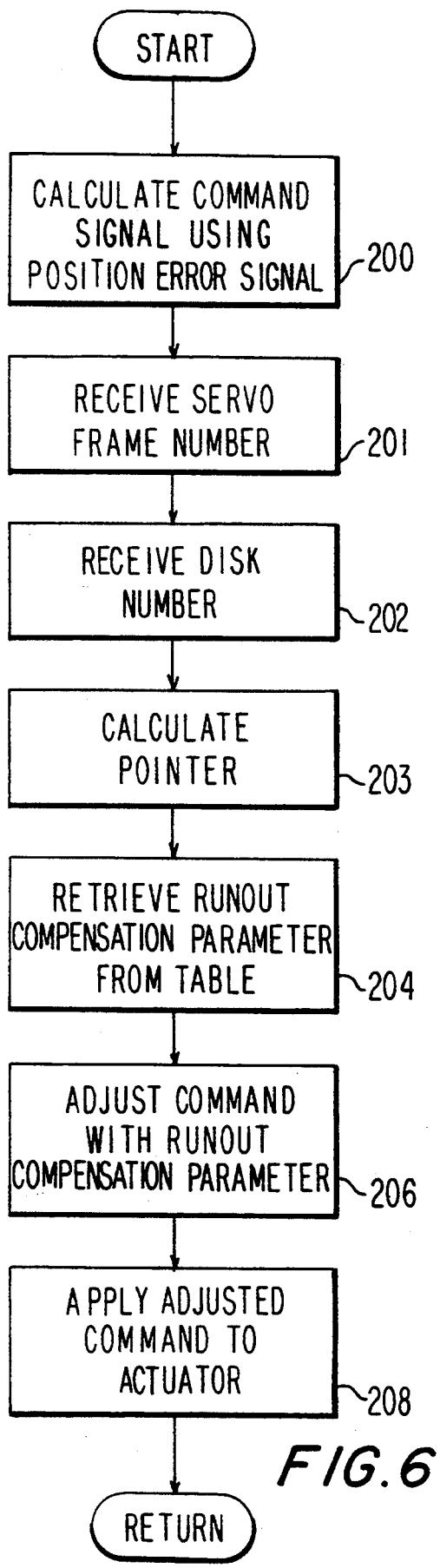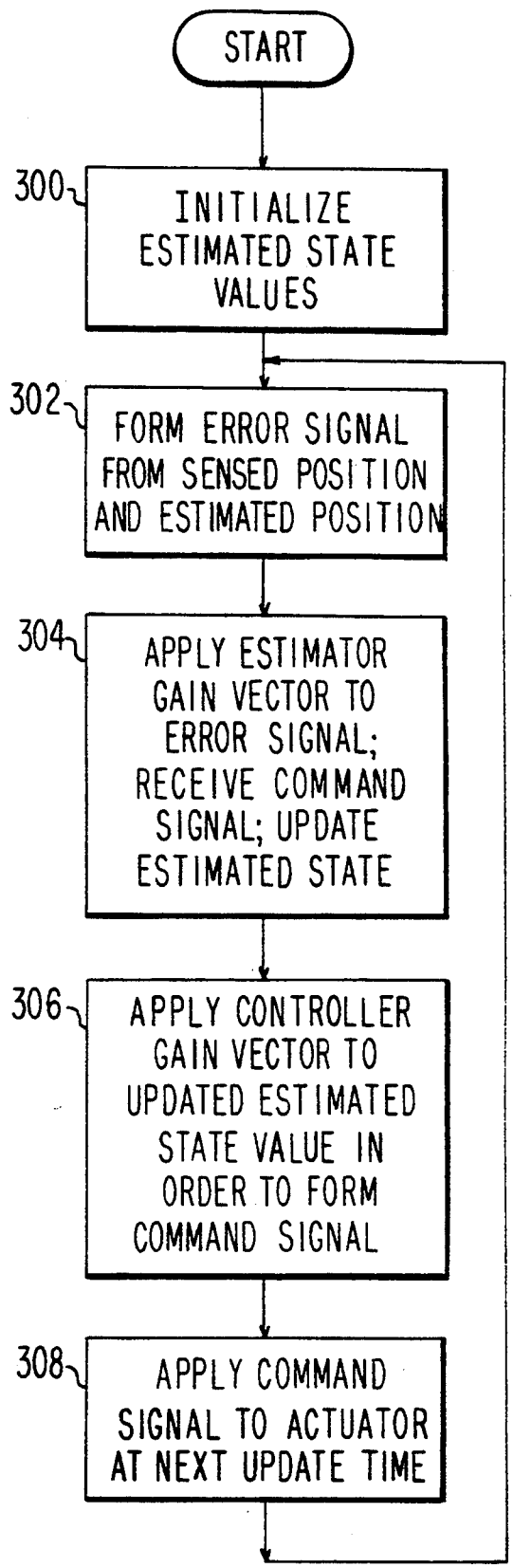
FIG. 6
FIG. 8

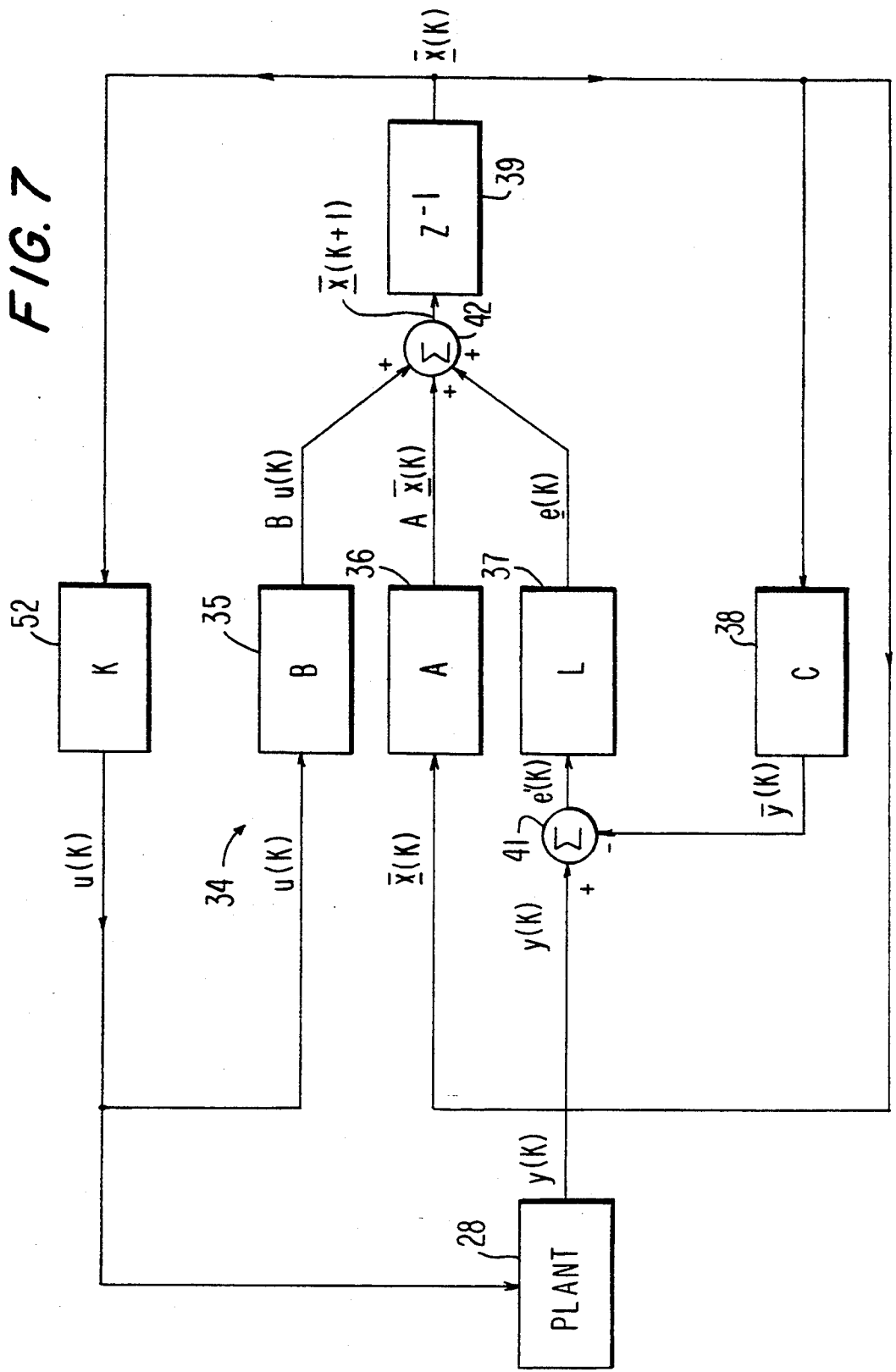

ESTIMATOR-BASED RUNOUT COMPENSATION IN A DISK DRIVE

This invention relates to servo systems for controlling the position of a magnetic read/write head in a disk drive, and more particularly to such servo systems which compensate for repetitive runout disturbances.

BACKGROUND OF THE INVENTION

A phenomenon called "repetitive runout" is known in the field of disk drives, and occurs if the axis of rotation of the disk is shifted from the center of the concentric data storage tracks. The shifting of the center of the tracks from the axis of rotation of the disk comes about because the disk spindle is usually of a different material than that of the disk. Accordingly, a large thermal excursion, together with a difference in the thermal expansion or contraction rate of the different materials, can cause shifting of the spindle relative to the balance of the disk.

As a result of the shift between the axis of rotation and the center of the tracks, the track being followed by the read/write magnetic head is displaced laterally in a sinusoidal fashion relative to the head as the disk rotates. This disturbance is what is referred to as repetitive runout.

Although the conventional track following servo system attempts to compensate for repetitive runout, and succeeds in doing so to some extent, not all of the repetitive runout disturbance can be compensated for by conventional servo track following systems, so that the accuracy of track following remains adversely affected.

It is known to prevent the shift of the axis of rotation of the disk by taking certain steps during the manufacturing process, such as thermal treatment of the disk drive prior to defining the tracks on the disk. However, these steps add complexity and cost to the manufacturing process.

It is also known to provide compensation data to be used in positioning the magnetic head. According to a conventional technique, this data is obtained by performing a spectral analysis of track following signals, using a fast Fourier transform (FFT), in order to obtain the magnitude and phase of the sinusoidal repetitive runout disturbance. However, other disturbances in the operation of the disk drive cause the phase and amplitude data obtained from the FFT to be somewhat inaccurate, so that repetitive runout compensation is not performed with a desired degree of accuracy.

OBJECTS OF THE INVENTION

Accordingly, it is an object of the present invention to provide a method and apparatus which eliminate or alleviate the foregoing problems; specifically, it is an object of the invention to provide a head positioning servo system for a disk drive with more complete compensation for repetitive runout disturbances than in prior art devices.

It is another object of the invention to provide a head positioning servo system in a disk drive which estimates the position of the read/write head relative to a track by using a mathematical model of the head positioning mechanism that incorporates parameters representing repetitive runout.

It is an additional object of the invention to provide a head positioning servo system for a disk drive in which a table of values representing a runout parameter is used to compensate for repetitive runout.

It is a further object of the invention to provide a head positioning servo system for a disk drive in which estimates of the position of the read/write head relative to a track are generated and used in real time for controlling positioning of the read/write head.

SUMMARY OF THE INVENTION

In accordance with the present invention, the foregoing objects are met, in a data storage device which includes a rotary disk on which data is magnetically recorded in concentric circular tracks, a magnetic head for reading data from and writing data in the concentric tracks, and an actuator for moving the magnetic head on a path that crosses the concentric tracks, by providing a method of controlling a position of the magnetic head to compensate for repetitive runout disturbances. The method includes the steps of sensing a position of the magnetic head relative to one of the concentric tracks, generating a sensed position signal indicative of the sensed position of the magnetic head, storing estimated state signals including an estimated position signal, an estimated velocity signal, an estimated bias signal and first and second estimated runout parameter signals, calculating an error signal on the basis of the sensed position signal and the estimated position signal, and updating the stored estimated state signals on the basis of the error signal and a signal representative of a control signal applied to the actuator. The first and second estimated runout parameter signals vary sinusoidally at a frequency that is substantially the same as the frequency of rotation of the rotary disk.

According to other aspects of the invention, the sensing, generating, calculating and updating steps are performed repeatedly and the repeated updating steps are performed in such a manner that the error signal is brought within a predetermined range during a time period that is substantially equal to the rotational period of the rotary disk.

According to a further aspect of the invention, the method includes the steps of generating a time series of the first estimated runout parameter signal commencing at a time after the error signal has been brought within the predetermined range, applying a scaling factor to each signal of the time series of the first estimated runout parameter signal to form scaled runout parameter signals, storing the scaled runout parameter signals as runout table signals, determining a rotational position of the rotary disk, selecting one of the runout table signals on the basis of the determined rotational position of the rotary disk, generating a control signal on the basis of the selected runout table signal, and applying the generated control signal to the actuator.

According to yet another aspect of the invention, the method includes generating a control signal on the basis of the updated estimated state signals and applying the generated control signal to the actuator.

According to another aspect of the present invention, a data storage device includes a rotary disk on which data is magnetically recorded in concentric circular tracks, a magnetic head for reading data from and writing data in the concentric tracks, an actuator for moving the magnetic head on a path that crosses the concentric tracks, and a control system for receiving track following signals picked up by the magnetic head from the rotary disk and for applying control signals to the actuator so that positioning of the magnetic head is controlled to compensate for repetitive runout disturbances. The control system includes a processor and a memory associated with the processor and the processor is programmed to generate on the basis of the received track following signals a sensed position signal indicative of a position of the magnetic head relative to one of the concentric tracks. The processor is also programmed to store in the memory estimated state signals including an estimated position signal, an estimated velocity signal, an estimated bias signal and first and second estimated runout parameter signals. The processor is also programmed to calculate an error signal on the basis of the sensed position signal and the estimated position signal and to update the stored estimated state signals on the basis of the error signal and a signal representative of a control signal applied by the control system to the actuator. The first and second estimated runout parameter signals vary sinusoidally at a frequency that is substantially the same as the frequency of rotation of the rotary disk.

According to further aspects of the invention, the processor repeatedly generates the sensed position signal, calculates the error signal and updates the stored estimated state signals in such a manner that the error signal is brought within a predetermined range during a time period that is substantially equal to a rotational period of the rotary disk.

According to still another aspect of the invention, the processor is also programmed to generate a time series of the first estimated runout parameter signal commencing at a time after the error signal has been brought within the predetermined range, to apply a scaling factor to each signal of the time series of the first estimated runout parameter signal to form scaled runout parameter signals, and to store the scaled runout parameter signals in the memory as runout table signals. The control system detects a frame signal stored on the rotary disk and representative of a rotational position of the disk, reads out one of the runout table signals from the memory on the basis of the detected frame signal, generates a control signal on the basis of the runout table signal that was read out from the memory, and provides the generated control signal to the actuator.

According to another aspect of the invention, the control system generates a control signal on the basis of the updated estimated state signals and applies the control signal to the actuator.

It is not intended that the invention be summarized here in its entirety. Rather, further features, aspects and advantages of the invention will be set forth in or apparent from the following description and drawings.

BRIEF DESCRIPTION OF THE DRAWINGS

In the drawings:

FIG. 6 is a flow chart illustrating a software routine for adjusting a command signal in accordance with FIG. 4;

FIG. 7 is a schematic block diagram of a head position servo system utilizing a state-space model in real time, in accordance with another embodiment of the invention;

FIG. 8 is a flow chart of a software routine for operating the servo system of FIG. 7.

DETAILED DESCRIPTION OF THE PREFERRED EMBODIMENTS

Figure 1:
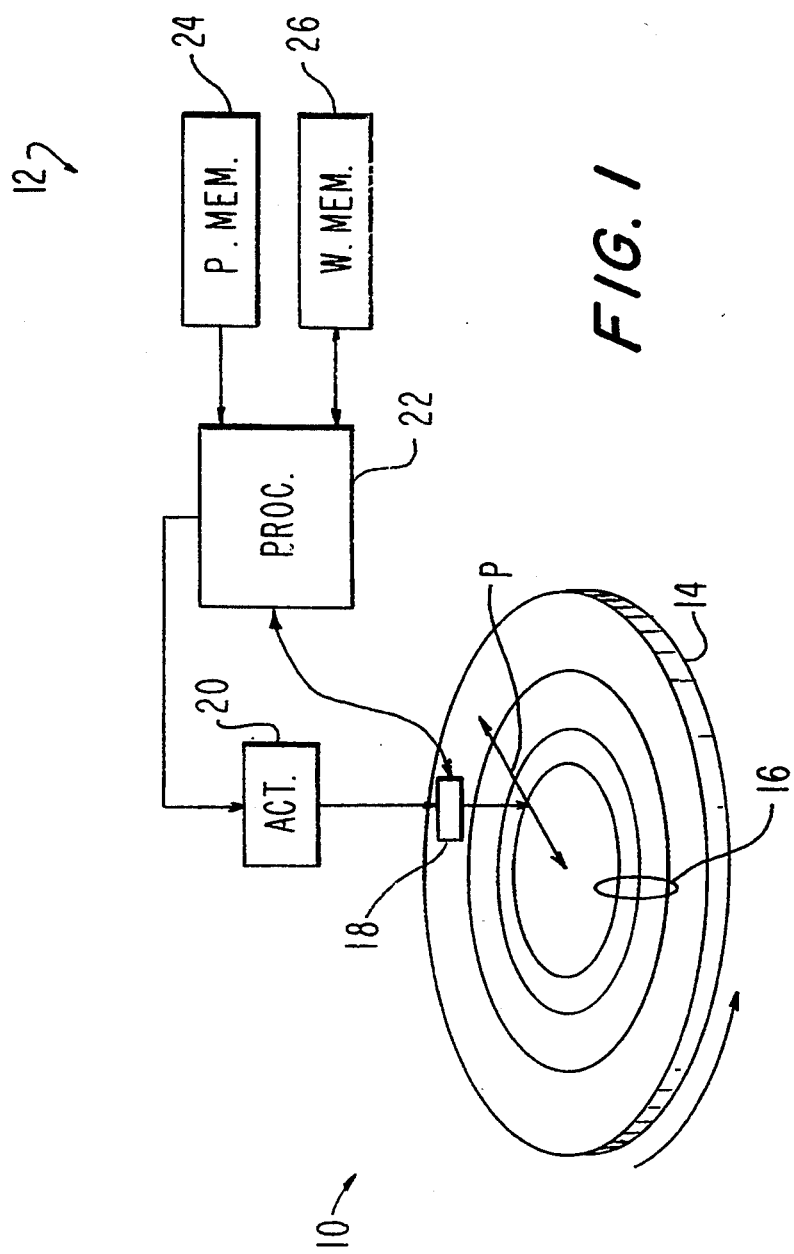
FIG. 1 is a schematic illustration of a disk drive having a head position servo system in which the present invention is applied.

FIG. 1 illustrates, in general terms, a disk drive 10, which includes a servo system 12 in which a runout compensation technique according to the present invention is incorporated.

All of the hardware components making up disk drive 10 may be conventional, with the inventive technique being carried out in accordance with a stored program provided according to the present invention.

The disk drive 10 includes at least one rotary magnetic disk 14 on which are formed a plurality of concentric circular tracks 16. A magnetic read/write head 18 reads data from and writes data in the concentric tracks 16.

The head position servo system 12 includes an actuator 20 which selectively moves the read/write head 18 in either one of two directions along a path P that crosses the concentric tracks 16. Control signals to the actuator 20 are provided by a processor 22, such as a conventional microprocessor which has a program memory 24 and a working memory 26 associated therewith. Processor 22 and at least part of memories 24 and 26 may be embodied as a conventional microcontroller such as the Intel 80C196-KC. Processor 22 receives from read/write head 18 signals picked up by the head 18 from the concentric tracks 16. The signals received by processor 22 via read/write head 18 include track following signals prerecorded on the disk 14.

According to a conventional track following scheme, the track following signals are recorded in bursts that are arranged on alternate sides of each track 16. Processor 22 compares the relative amplitudes of successive burst signals to determine whether the head 18 is displaced toward the left or the right of the track 16 which it is following, and processor 22 performs appropriate calculations to generate a control signal which is applied to actuator 20 for controlling the position of read/write head 18 based on the relative amplitudes of the burst signals. The burst signals also include, according to the conventional scheme, such information as a frame number, a track number, etc.

Although not explicitly shown in FIG. 1, it should be understood that the connections between read/write head 18 and processor 22 and between processor 22 and actuator 20 may include conventional signal conditioning circuitry such as an analog-to-digital converter for A/D converting track following bursts picked up from rotary disk 14, and a digital-to-analog convertor for D/A converting control signal output from processor 22. Conventional amplifier stages also are not explicitly shown.

A. HYBRID RUNOUT COMPENSATION TECHNIQUE

A first embodiment of the invention, in which runout compensation is combined with a conventional head position servo system, will be described now with reference to FIGS. 2–6.

1. Calibration Procedure

Figure 2:
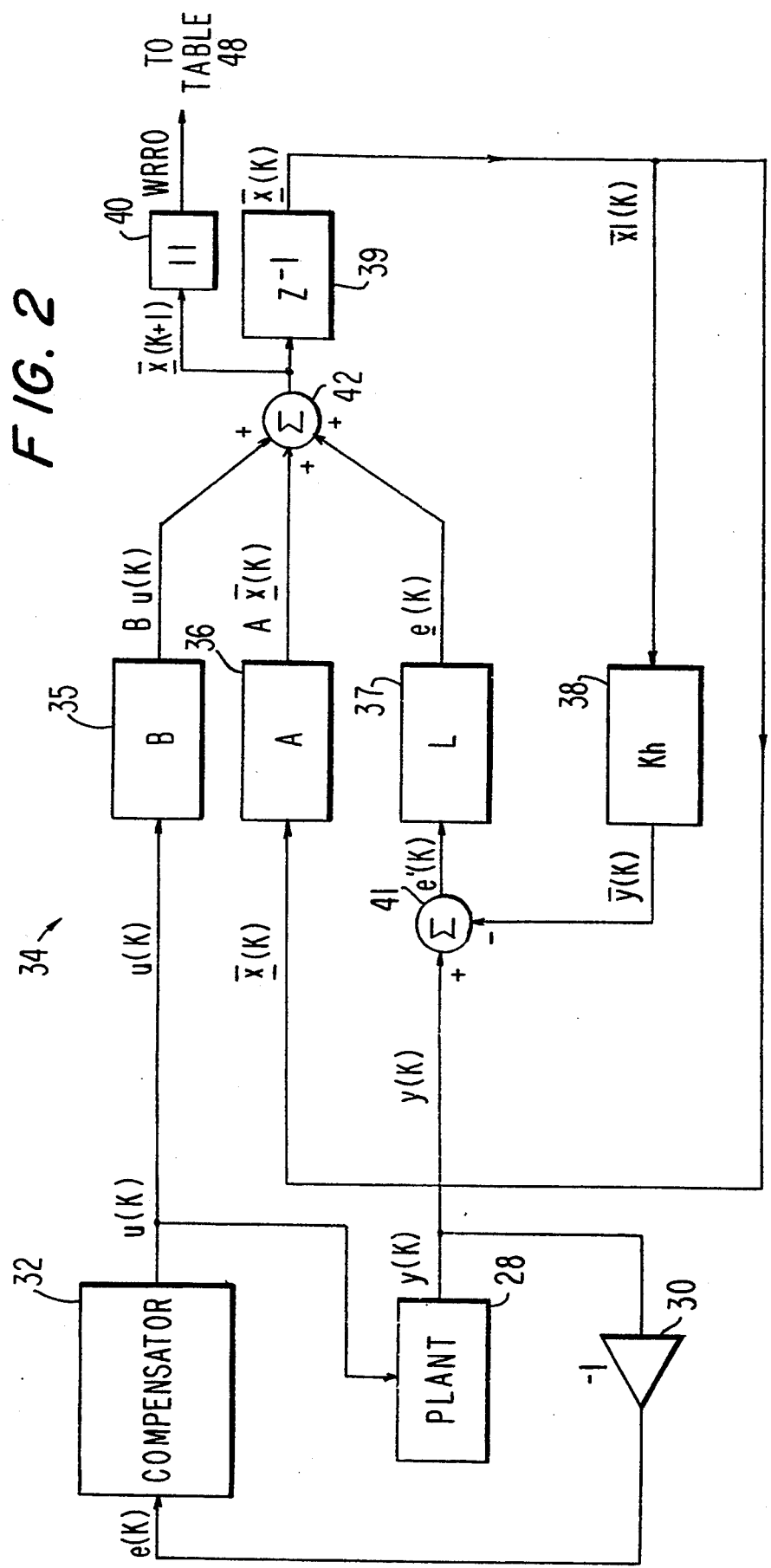
FIG. 2 is a schematic block diagram of a discrete-time system for generating a table of runout compensation values in accordance with an embodiment of the invention.

FIG. 2 is a schematic representation of the functions carried out in a servo system according to this embodiment in order to generate a table of runout compensation values. As shown in FIG. 2, a block 28 represents the physical head positioning portion of disk drive 10, including the actuator 20 and the associated electronics and read/write head 18 and is referred to as the "plant" as is common in automatic control applications. A signal y, representing a sensed position of the read/write head 18, is shown in FIG. 2 as being output from the plant 28. It will be understood that the signal y may, in fact, represent a signal received by processor 22 via read/write head 18, or may be a signal generated by processor 22 based on track following signals picked up from disk 14 by read/write head 18. In any event, the servo system 12 functions to sense the position of head 18 relative to one of the concentric tracks 16 and generates the signal y representing the sensed position.

The sensed position signal y is provided through a negative feedback circuit 30, such as an inverter, as an error signal e to a compensator 32. On the basis of the current and previous error signals e and the previous commands, the compensator 32 generates a command signal u for driving the actuator 20 in a direction so that e is driven toward zero. The resulting command signal u is applied as a control signal to the plant 28, and particularly to the actuator 20. In a preferred embodiment of the invention, the negative feedback circuit 30 and the compensator 32 are both implemented by being embodied by the processor 22, operating in a conventional manner under control of a program stored in program memory 24.

In addition to serving as a control signal for the plant 28, command signal u is also provided as an input to an estimator 34. As will be seen, estimator 34 provides an estimate of the position of read/write head 18 relative to a track 16 and also estimates other conditions of plant 28 which affect positioning of the head 18.

The sensed position signal y is also provided as an input to the estimator 34.

The estimator 34 includes an input matrix block 35 which multiplies the command signal u by a column vector B to produce an input update vector. Also part of estimator 34 is a system matrix block 36 which premultiplies a delayed state vector $\underline{x}$ by a system matrix A to produce a system update vector. The signals making up the delayed state vector $\underline{x}$ are provided to the system matrix block 36 from a delay circuit 39.

Also included in the estimator 34 is an estimator gain block 37, which multiplies a scalar error signal e' by a column vector L to produce an error update vector. The error signal e' provided to the estimator gain block 37 is formed by a summing circuit 41 as the difference between the sensed position signal y and an estimated position signal e,ovs/y/ provided by an output gain block 38. As will be seen, the output gain block 38 forms the estimated position signal $\bar{y}$ by multiplying one of the signals making up the delayed state vector $\bar{x}$ by a transducer gain constant Kh.

The input update vector, the system update vector and the error update vector, respectively output from input matrix block 35, system matrix block 36 and estimator gain block 37 are all summed at summing circuit 42 to provide an updated state vector. A scaling block 40 multiplies one of the state signals making up the updated state vector by a scaling factor and outputs the scaled signal as a runout compensation value wrro to be stored in a table 48 which will be described below. The updated estimated state vector formed by summing circuit 42 is also provided as an input signal to delay circuit 39.

In a preferred embodiment of the invention, scaling block 40 and all of the blocks 35, 36, 37, 38, 39, 41 and 42 making up estimator 34 are implemented by processor 22 operating under control of a suitable program stored in program memory 26.

Figure 3:
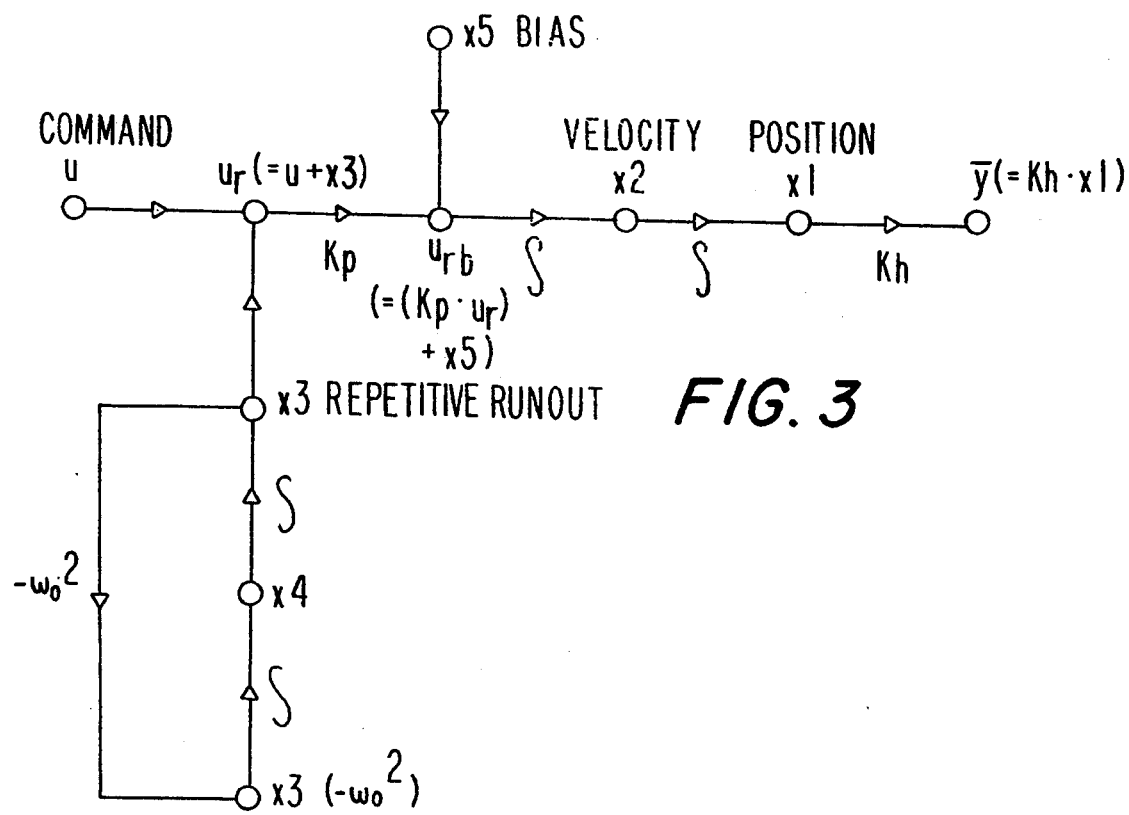
FIG. 3 is a signal flow graph which represents a plant model used for establishing matrix values incorporated in the system of FIG. 2.

The design of estimator 34 is based on a theoretical model of the servo system physical plant, as illustrated in FIG. 3 in the form of a signal flow graph.

Referring now to FIG. 3, operation of the plant 28 is modeled using five state variables x1, x2, x3, x4 and x5, which respectively represent head position, head velocity, a first runout parameter, a second runout parameter and a bias torque.

The first runout variable x3 is formed by integrating the second runout variable x4, which in turn is formed by integrating a product resulting from multiplication of x3 by $-\omega_0^2$, where $\omega_0$ is the rotational frequency of the disk 14 in radians per second. The first runout variable x3 represents an apparent acceleration of the read/write head 18 relative to the track 16 which the head 18 is following. The apparent acceleration is due to repetitive runout and the physical phenomenon represented by the variable x4 is the lateral acceleration of the track 16 relative to the head 18 caused by rotation of the disk 14 and as a result of the shift between the center of the track 16 and the axis of rotation of disk 14.

Together the variables x3 and x4 form an oscillator, and the values of x3 and x4 vary sinusoidally at a frequency that is the same as the rotational frequency of the disk 14.

In the model of FIG. 3, the first runout variable x3 is summed with the command signal u (representing an acceleration applied to the head 18 by actuator 20) to form an adjusted command signal $u_r$. The adjusted command signal $u_r$ is multiplied by an acceleration constant Kp and the resulting signal is summed with the bias variable x5 to form a bias adjusted command signal $u_{rb}$ (=x5+($u_r$Kp)). The variable x5 represents a torque applied to actuator 20 by a conventional flexible lead connected to actuator 20. It should be noted that so long as head 18 is positioned for following a given one of the tracks 16, the value of the variable x5 is substantially constant, but the value of the variable x5 varies depending on which of the tracks 16 is being followed by the head 18. The bias-adjusted command signal $u_{rb}$ is integrated to provide the head velocity variable x2, which, in turn, is integrated to provide the head position variable x1. The variable x1 is multiplied by a factor Kh, which represents the transducer gain, in order to provide the estimated position signal $\bar{y}$, which represents an estimated position of the read/write head 18 according to the model of FIG. 3.

The model of FIG. 3 can be represented by the following set of first-order, ordinary differential equations:

$$\bar{x}1 = x2 \tag{1}$$

$$\bar{x}2 = x5 + Kp \cdot x3 + Kp \cdot u$$

$$\bar{x}3 = x4$$

$$\bar{x}4 = -\omega_0^2 \cdot x3$$

$$\bar{x}5 = 0$$

A matrix representation of the model of FIG. 3 and the equations shown at (1) is as follows:

$$\dot{\underline{x}} = F\underline{x} + Gu, \tag{2a}$$

and $$y = C\underline{x} \tag{2b}$$

where $\underline{x}$ is the state vector:

$$\begin{bmatrix} x1 \\ x2 \\ x3 \\ x4 \\ x5 \end{bmatrix} \tag{3}$$

$$F = \begin{bmatrix} 0 & 1 & 0 & 0 & 0 \\ 0 & 0 & Kp & 0 & 1 \\ 0 & 0 & 0 & 1 & 0 \\ 0 & 0 & -\omega_0^2 & 0 & 0 \\ 0 & 0 & 0 & 0 & 0 \end{bmatrix} \tag{4a}$$

$$G = \begin{bmatrix} 0 \\ Kp \\ 0 \\ 0 \\ 0 \end{bmatrix}$$

$$C = [Kh\ 0\ 0\ 0\ 0] \tag{4b}$$

One of the main purposes of the estimator 34 shown in FIG. 2 is to provide an estimate of the position of head 18 relative to the track 16 which it is following on the basis of the model shown in FIG. 3. The estimator 34 generates estimated values of the five state variables x1, x2, x3, x4 and x5, and forms an estimated position signal $\bar{y}$ as the product of the value of the estimated state variable x1 and the constant Kh. The estimated position signal $\bar{y}$ is subtracted from the sensed position signal y to form the error signal e' and an updated estimated state vector $\bar{x}$ is formed as the sum of update vectors, which in turn are formed from the command signal u, the error signal e' and the state vector prior to updating. The error update signal is generated so as to drive the error signal e' to zero, so that, after a settling period, the values of the estimated state vector can be considered to represent physical conditions of the plant 28. In particular, the first run out variable x3 can be considered to represent the apparent acceleration of the head 18 relative to the track 16 due to repetitive runout and this value can be stored as a compensation value in a table.

Selection of the coefficients making up input gain vector B, system matrix A, and estimator gain vector L, as carried out during the design of estimator 34, will now be described.

If the values of the state vector $\underline{x}$ are known at an initial time $t_0$, then the values of the state vector at a later time $t = T + t_0$ can be provided by the following solution:

$$\underline{x}(T + t_0) = A \cdot \underline{x}(t_0), \tag{5}$$

where $A = e^{FT}$, the matrix exponential, $$e^{FT} = \sum_{k=0}^{\infty} \frac{(FT)^k}{k!} \tag{6}$$

$$= 1 + FT + (\tfrac{1}{2})F^2T^2 + \ldots$$

Because the estimator 34 preferably operates as a discrete time system rather than the continuous time model shown in FIG. 3, equation 5 is rewritten as:

$$\underline{x}(k+1) = A \cdot \underline{x}(k) \tag{7}$$

The sampling period T is implicit in equation 7 and subsequent equations.

However, if $\underline{x}(t_0)$ is not known, an adjustment function L can be provided to drive an error condition e' toward zero. In discrete-time terms, $$\bar{\underline{x}}(k+1) = A\,\bar{\underline{x}}(k) + L\,e'(k) \tag{8}$$

Moreover, the model of FIG. 3 has a command input u so that $$\bar{\underline{x}}(k+1) = A\bar{\underline{x}}(k) + Bu(k) + Le'(k), \tag{9}$$

$$B = \int_0^T e^{F\eta} d\eta \cdot G \tag{10}$$

For reasons well understood by those having ordinary skill in the art, if the sample-to-correction delay $\lambda$ is not negligible, then an additional state variable $\underline{x}6$ representing the delayed command u is included in $\underline{x}$, so that A is a $6 \times 6$ matrix and B and L are both $6 \times 1$ vectors.

The elements of A and B can be calculated on the basis of F and G (equations (3) and (4)) and T, using standard computer-aided-design software tools such as the well-known Matlab software package. In the disk drive 10 of FIG. 1, the rotational frequency of disk 14 is 75 Hz so that $\omega_0 = 2\pi \times 75$ rad/sec. Fifty-four embedded servo frames are provided in each track 16, and the track following signal sample rate is accordingly 54 times per rotation, so that the sampling time $T = 1/(75 \times 54) = 246.9$ $\mu$sec.

In the embodiment of FIG. 2, A and B were evaluated as follows:

$$A = \begin{bmatrix} 1 & 1 & 1.0378 & .34608 & .5 & .28087 \\ 0 & 1 & 2.0732 & 1.0378 & 1 & .30296 \\ 0 & 0 & .99324 & .99775 & 0 & 0 \\ 0 & 0 & -.013508 & .94324 & 0 & 0 \\ 0 & 0 & 0 & 0 & 1 & 0 \\ 0 & 0 & 0 & 0 & 0 & 0 \end{bmatrix}$$

-continued $$B = \begin{bmatrix} .75808 \\ 1.7749 \\ 0 \\ 0 \\ 0 \\ 1 \end{bmatrix}$$

Establishing the values of the estimator gain vector L will now be described.

Referring to equation (9), the error condition e'(k) can be defined as the difference between the sensed position signal y(k) and the estimated position signal $\bar{y}(k) = C \bar{x}(k)$ (where C=[kh 0 0 0 0 0]). Equation (9) can be rewritten as:

$$\bar{x}(k+1) = A \bar{x}(k) + Bu(k) + L[y(k) - C \bar{x}(k)], \quad (11)$$

which can be rearranged as:

$$\bar{x}(k+1) = (A - LC)\bar{x}(k) + Bu(k) + Ly(k). \quad (12)$$

Because y(k) is an input to the estimator 34, estimator 34 can be considered a system that has u(k) and y(k) as inputs and x1(k), x2(k), x3(k), x4(k), x5(k), x6(k) as outputs. The system equations for estimator 34 can be written as $$\bar{x}(k+1) = A_e \bar{x}(k) + B_e \begin{bmatrix} u(k) \\ y(k) \end{bmatrix}, \quad (13)$$

where $A_e = A - LC$ and $$B_e = \begin{bmatrix} B_1 & L_1 \\ \cdot & \cdot \\ \cdot & \cdot \\ \cdot & \cdot \\ B_6 & L_6 \end{bmatrix} \text{ (i.e. } B_e = [B \ L])$$

$A_e$ is a 6×6 matrix and $B_e$ is a 6×2 matrix. The dynamic behavior of estimator 34 depends on the values of L. The eigenvalues of $A_e$ are the poles of estimator 34.

Figure 9A:
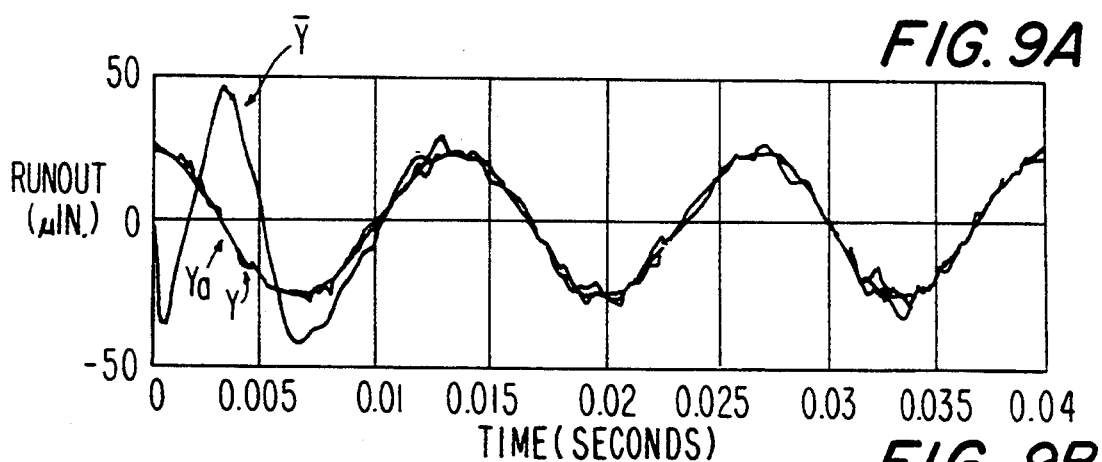
FIGS. 9A and 9B graphically illustrate convergence of an estimated position signal with an actual position of a read/write head and a sensed position signal in the system of FIG. 2.
Figure 9B:
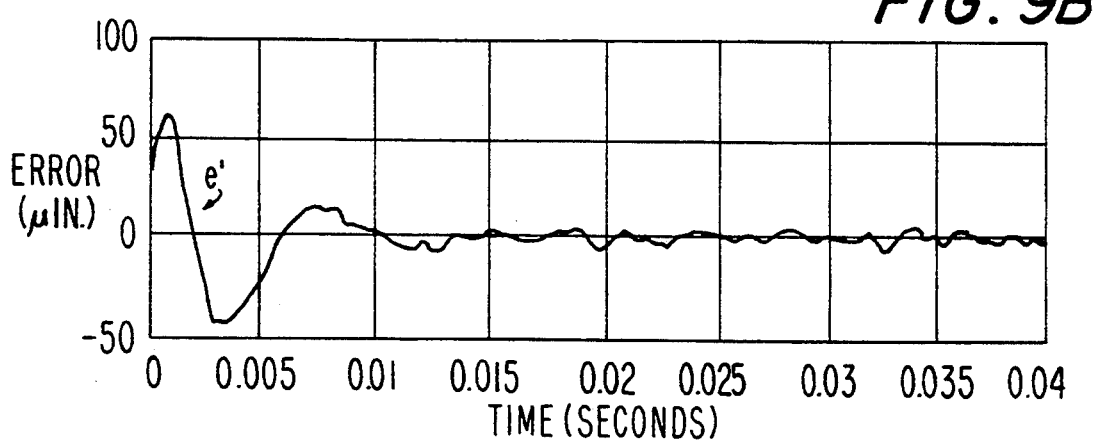
Figure 9C:
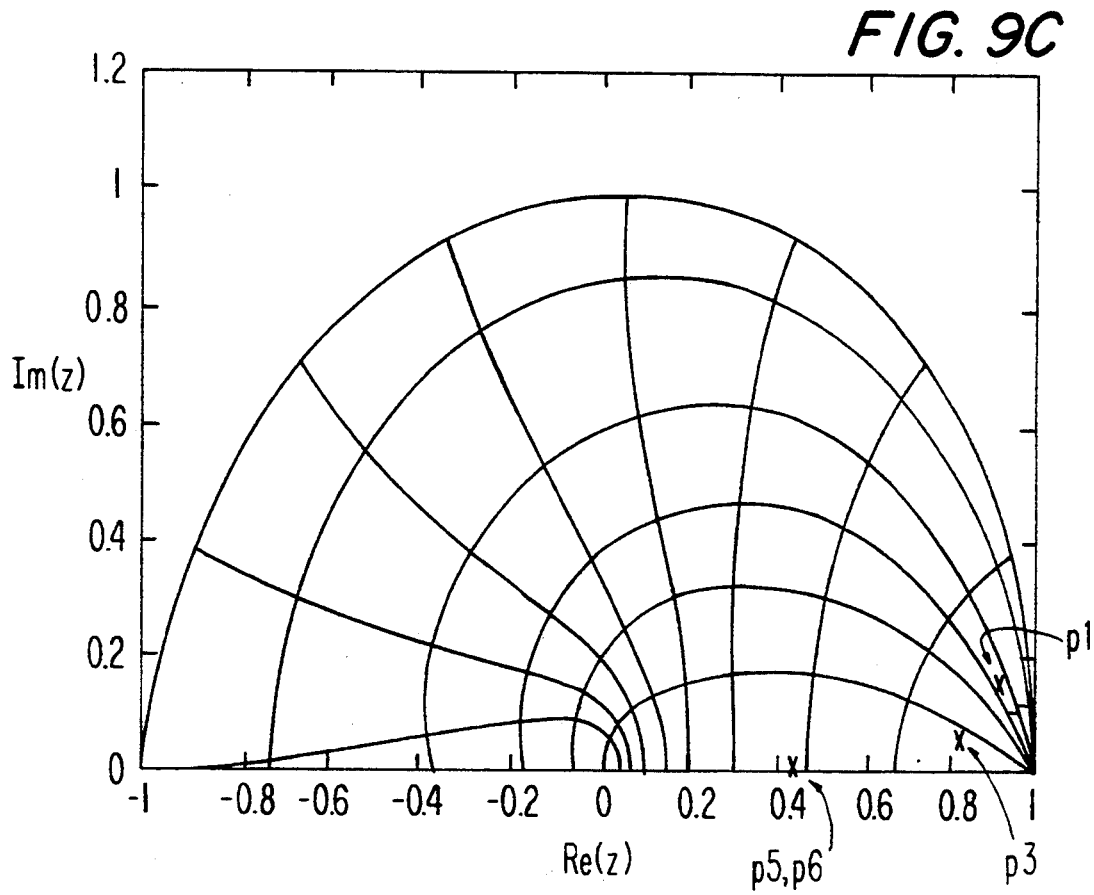
FIG. 9C is a graphical illustration of a pole selection that is made for establishing matrix values used in the system of FIG. 2.

The poles of estimator 34 are selected so as to provide a desired transient performance of estimator 34. In a preferred embodiment of the system of FIG. 2, it was desired that the step response settle to within 1% or less after one rotational period of disk 14 (i.e. after 54 samples or 13.3 msec). Poles were selected as would be appropriate for a fourth order Butterworth filter having the desired step response. The fifth and sixth poles were selected to have a radius equal to one half of the shortest radius of the first four poles, so that the first four poles dominate. (It has been found that selecting the poles as for a sixth order Butterworth filter resulted in excessive ringing behavior in the resulting estimator.) The poles p1–p6 as selected were:

| | |
|---|---|
| 0.9146 + 0.1646i | (p1) |
| 0.9146 − 0.1646i | (p2) |
| 0.8342 + 0.0622i | (p3) |
| 0.8342 − 0.0622i | (p4) |
| 0.4183 | (p5) |
| 0.4183 | (p6) | and are graphically shown in FIG. 9C, except that poles p2 and p4 are not explicitly shown in FIG. 9C, being respectively the mirror images with respect to the abscissa axis of poles p1 and p3.

The selected poles p1–p6 were then provided as inputs to a software implementation of Ackermann's method provided as part of the above mentioned Matlab CAD software and the required values of L were calculated by the software so that $A_e$ would have the desired eigenvalues. The resulting values for $A_e$ and $B_e$ after scaling to prevent calculation overflows, were $$A_e = \begin{bmatrix} .34771 & 1.00 & .03243 & .0013519 & .03125 & 1.1235 \\ -1.6816 & 1.00 & .064788 & .0040538 & .0625 & 1.2118 \\ -1.8494 & 0 & .99324 & .12472 & 0 & 0 \\ -.35557 & 0 & -.10806 & .99324 & 0 & 0 \\ -.43161 & 0 & 0 & 0 & 1 & 0 \\ 1.1968 & 0 & 0 & 0 & 0 & 0 \end{bmatrix}$$

$$B_e = \begin{bmatrix} .011845 & .010192 \\ .027733 & .026276 \\ 0 & .0028897 \\ 0 & .0055558 \\ 0 & .006744 \\ .0039063 & .018699 \end{bmatrix} = [B \ L]$$

Having explained selection of the coefficients making up the matrices B, A and L, additional details of the operation of the estimator 34 will now be described with reference to FIG. 5, which is a flow chart of a software routine for carrying out a calibration procedure in which the estimator 34 is used to generate a table of runout compensation values. The routine of FIG. 5 is carried out each time power is applied to commence rotation of rotary disk 14.

Figure 5:
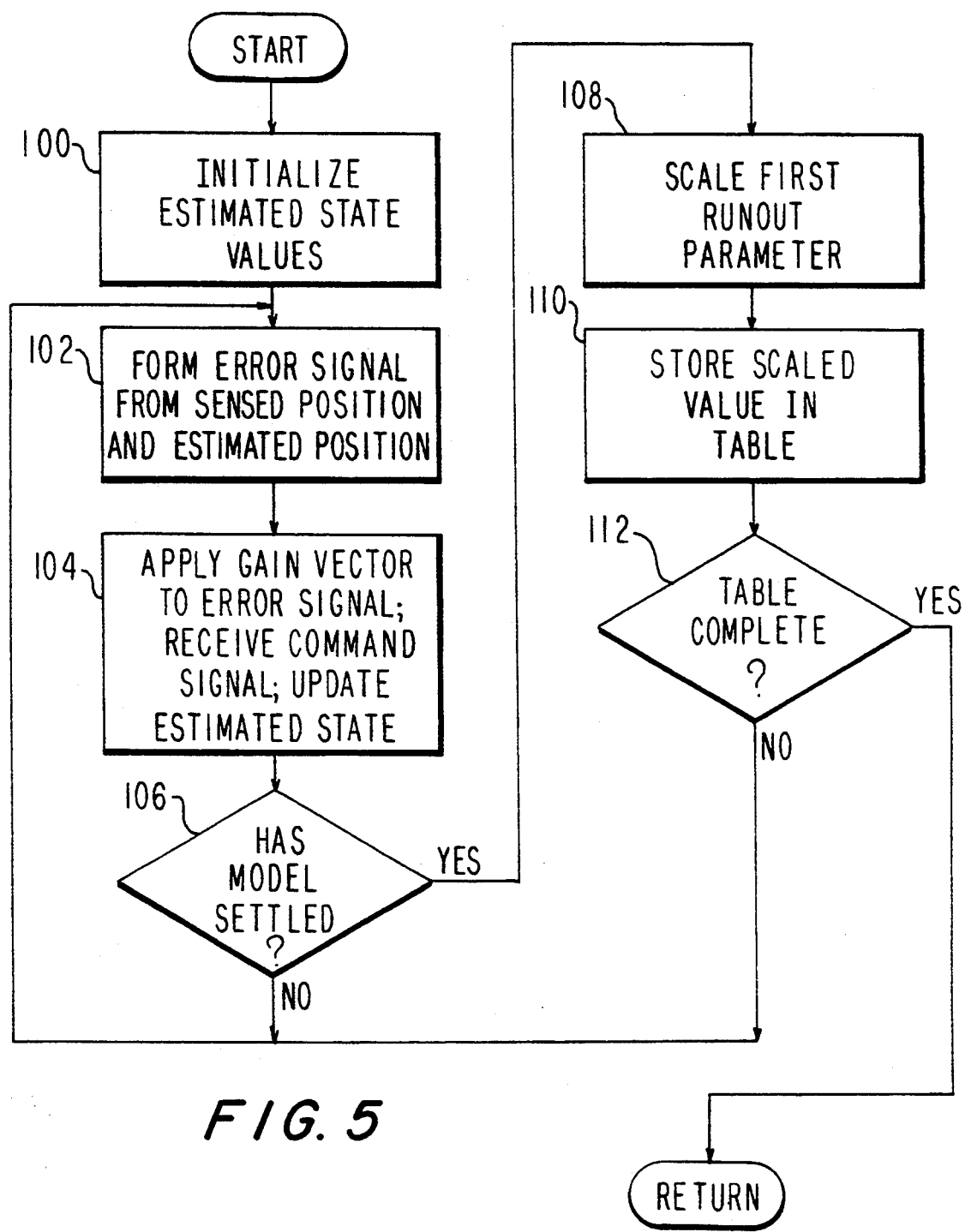
FIG. 5 is a flow chart illustrating a software routine for generating the runout compensation table referred to in connection with FIG. 2.

In the first step 100 of the routine of FIG. 5, initial values of the variables x1, x2, x3, x4, x5, and x6 are stored. In a preferred embodiment of the invention, all of the initial values are set to zero. Step 102 then follows, at which the estimator error signal e' is produced by the summing circuit 41 as the difference between the estimated position signal $\bar{y}$ and the sensed position signal y.

Next is step 104, at which the estimator gain block 37 multiplies the error signal e' by estimator gain column vector L to produce the error update vector $\underline{e}(k)$, input matrix block 35 forms the input update vector $\bar{B}$ u(k) by multiplying the command signal u(k) by the input matrix B, and system matrix block 36 forms the system update vector A $\bar{x}(k)$ by pre-multiplying the delayed state vector $\bar{x}(k)$ by the system matrix A. Summing circuit 42 forms an updated state vector $\bar{x}(k+1)$ as the sum of the error update vector $\underline{e}(k)$, the input update vector B u(k) and the system update vector A $\bar{x}(k)$.

At step 106, which follows step 104, it is determined whether the estimated position signal $\bar{y}$ has "settled". Settling of estimated position signal $\bar{y}$ is illustrated in FIGS. 9A and 9B. FIG. 9A includes a smooth sinusoidal trace $Y_a$, representing the actual position of head 18 as affected by repetitive runout; a slightly bumpy sinusoidal trace y, representing the sensed position signal affected by the runout disturbance and also by noise; and a trace $\bar{y}$ representing the estimated position signal. In FIG. 9B the trace e' represents the error signal formed as the difference between y and $\bar{y}$. It will be seen that $\bar{y}$ is brought close to y, and e' is brought close to zero, within less than 0.0133 seconds, the rotational period of disk 14. The determination of whether $\bar{y}$ has settled could be based upon the magnitude of the estimator error signal e', but since the estimator 34 is established so that $\bar{y}$ settles during one rotation of disk 14, the determination is more simply made on the basis of whether the requisite time period has elapsed. If such is not the case, then the loop of steps 102, 104, and 106 is repeated until $\bar{y}$ has settled, i.e., until the disk completes a rotation.

If the determination at step 106 is in the affirmative, then the routine of FIG. 5 proceeds to generation and storage of determination at step 106. At step 108, the first runout parameter x3 is scaled by an appropriate scaling coefficient in scaling block 40 to generate a runout compensation value wrro and this value is stored in a table 48 in working memory 26 (step 110). Next is step 112, at which it is determined whether the table is complete. Because the state vector $\bar{x}$ has been updated so that, within a predetermined small range, the state values x1, x2, x3, x4, x5, x6 including the first runout parameter x3, closely emulate the actual functioning of the plant 28, it will be understood that the first runout parameter x3 reflects the repetitive runout behavior of the plant 28 as referred to its input. Thus at each point during a rotation of rotary disk 14, the first runout parameter x3 represents an effect of the repetitive runout upon the positioning of read/write head 18 relative to the track 16 which is being followed by the head 18. Therefore, storage of a complete set of representative runout compensation values can be accomplished during one rotation of disk 14. Accordingly, the determination at step 112 is made in the negative until the steps 108 and 110 have been performed with respect to a time series of the first runout parameter x3 over a period of one rotation of disk 14. During this period of time, each determination at step 112 is in the negative, so that the loop of steps 102, 104, 106 (each time yielding an affirmative determination), 108 and 110 is carried out. When a time series of the parameter x3 has been generated over a rotational period of the disk 14 and steps 108 and 110 have been performed a corresponding number of times, then the needed runout compensation values wrro have all been stored in a table, so that the determination at step 112 is in the affirmative, and the routine ends.

It will be noted that the entire routine of FIG. 5 is carried out during two rotations of the rotary disk 14. During the first rotation the estimated state vector $\bar{x}$ is updated based on the error e' so that it accurately represents conditions of the physical plant 28. Then, during the second rotation, the table of runout compensation values is generated.

2. Read/Write Operation with Runout Compensation

Figure 4:
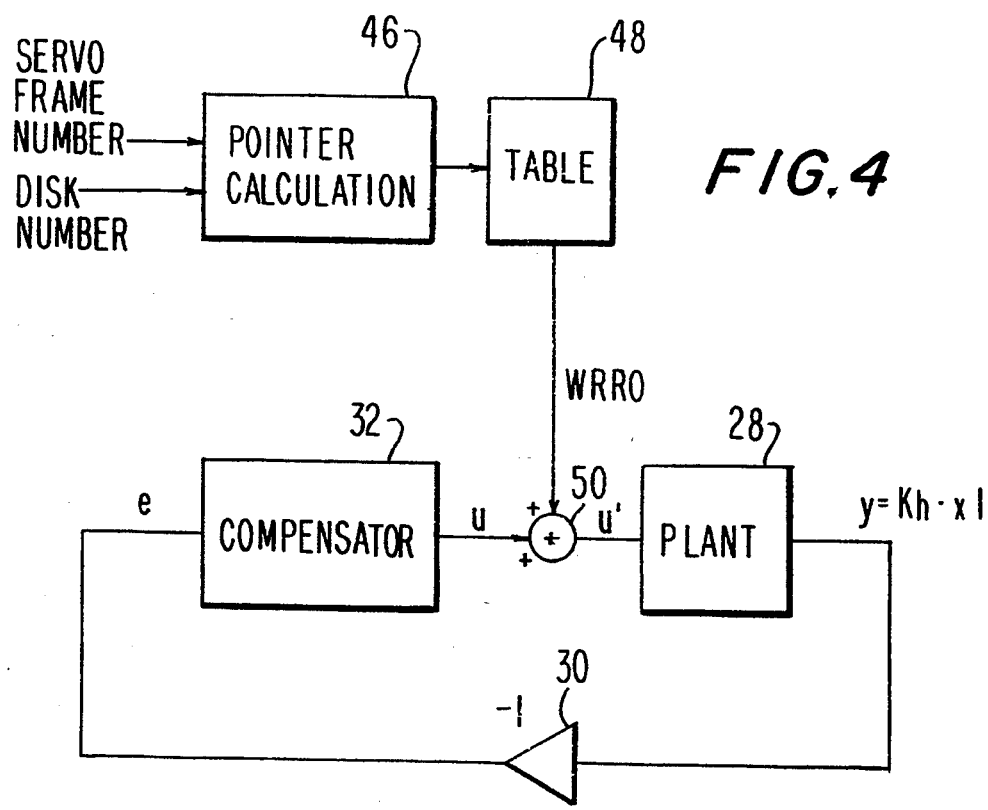
FIG. 4 is a schematic block diagram of a system for adjusting a command signal using a runout parameter value retrieved from the table referred to in connection with FIG. 2.

FIG. 4 illustrates in functional terms how compensation for repetitive runout is performed during read/write operations of disk drive 10. The head positioning control system as functionally illustrated in FIG. 4 includes the blocks 28, 30 and 32, respectively representing the plant, a negative feedback block and a compensator block, as described in connection with FIG. 2. The head positioning system as illustrated in FIG. 4 lacks the estimator 34 of FIG. 2, which is operated only during the calibration procedure described above.

In addition to the blocks 28, 30 and 32, which are as described in connection with FIG. 2, the control system of FIG. 4 also includes a pointer calculator 46, which calculates a table pointer as a function of a servo frame number signal picked up by read/write head 18 from the track following signals recorded on disk 14 and also as a function of a disk number (in the event that disk drive 10 includes more than one rotary data storage disk). Using the calculated pointer, processor 22 references a table 48 of the stored runout compensation values wrro that had been generated in the calibration phase. The readout value wrro, which is appropriate to the rotational position of disk 14, as represented by the frame number, is used by an adder 50, functioning as a command signal adjuster, to adjust the command signal u provided by compensator 32. The resulting adjusted command signal u' is applied as a control signal to plant 28 so that the desired position of read/write head 18 is controlled both in response to the error signal e and as a function of the stored runout compensation value wrro.

The pointer calculator 46, and the command signal adjuster 50, like the negative feedback function 30 and the compensator 32, are all preferably embodied in processor 22, operating under control of a program stored in program memory 24.

Additional details of a routine for runout compensation in accordance with the invention will be described with reference to FIG. 6.

FIG. 6 commences with a step 200, at which processor 22 calculates a command signal u on the basis of a position error signal. Next, at step 201, the processor receives the servo frame number reproduced from the disk 14. The disk number may also be reproduced from the disk (step 202), but in a preferred embodiment the disk number is a number that is associated with the particular head 18 being controlled. Next, at step 203, processor 22 calculates the pointer for reference to table 48 and at step 204 processor 22 reads out the appropriate runout compensation value from the location of the table 48 addressed by the calculated pointer. Next the processor 22 adjusts the command signal u in response to the runout compensation value wrro retrieved from table 48 by adding the compensation value wrro to the command signal u to form an adjusted command signal u' (step 206). Finally, at step 208, processor 22 applies the adjusted command signal u' as a control signal to actuator 20. In this way, substantially all of the head positioning disturbances due to repetitive runout are compensated for and the compensator 32 is left to carry out the function for which it was designed, namely to deal with disturbances from other sources.

Although not shown in FIG. 4, it should be understood that a primitive "seek" function can be implemented by applying an appropriate reference signal in the feedback loop between plant 28 and compensator 32 so that the plant 28 is driven to position read/write head 18 over a selected one of the tracks 16.

B. REPETITIVE RUNOUT COMPENSATION USING REAL TIME STATE SPACE ESTIMATE

Referring now to FIG. 7, a second embodiment of the invention will be described, in which head position control with runout compensation is performed on the basis of a state space estimator operated in real time. Block 28, and also blocks 35, 36, 37, 38, 39, 41 and 42 which comprise estimator 34, as shown in FIG. 7, are essentially the same as corresponding elements illustrated in FIG. 2, and so need not be described again, except to note that the coefficients making up the estimator gain vector L for block 37 in FIG. 7 are selected so that $\bar{y}$ settles much more rapidly than in the estimator 34 of FIG. 2. In other words, the error signal e' formed at summing circuit 41 is brought within the desired predetermined range near zero in a much shorter period of time than one rotation of disk 14. This is accomplished according to the design methodology described above, by selecting poles for a fourth order Butterworth filter having the desired shorter step response, and then calculating fifth and sixth poles and coefficients making up L as in the design of the estimator for the "hybrid" system.

The control system illustrated in FIG. 7 also differs from that of FIG. 2 in that it lacks the negative feedback block 30, compensator 32, and scaling circuit 40 shown in FIG. 2. Also, no table 48 is generated nor are runout compensation values read out from a table. Instead, the feedback loop is provided through the estimator 34, with the delayed estimated state vector $\bar{x}(k)$ output from delay circuit 39 being provided as an input to a controller gain block 52. The controller gain block 52 forms a command signal u(k) by pre-multiplying the updated estimated state vector $\bar{x}(k)$ by a controller gain vector $K = [K1, K2, K3, K4, K5, K6]$. The values of the controller gain coefficients K3, K4, K5 and K6 are respectively $-1$, 0, $-1$ and 0. That is, the first runout variable x3 and the bias variable x5 are simply passed through controller gain block 52 as negative feedback signals and the second runout variable x4 and the delayed command variable x6 are suppressed. This reflects the fact that of the six states (position, velocity, first and second runout variables, bias, and delayed command) only the first two, position and velocity, can be controlled in the physical plant. Cancellation of repetitive runout is accomplished by incorporating the term $-x3$ in the command signal u. Selection of the controller gain coefficients K1 and K2 will be described below.

The command signal u(k) generated by the controller gain block 52 on the basis of the estimated state vector $\bar{x}(k)$ is provided as a control signal to plant 28 and also is provided as an input signal to input matrix block 35. The controller gain block 52, like estimator 34, is preferably embodied in processor 22, operating under control of a program stored in program memory 24.

Selection of the controller gain coefficients will now be described. It will be recalled that an estimator gain vector L can be calculated to provide a relatively fast-settling estimator 34 for this state-space embodiment of the invention, based on poles that would be appropriate for a fourth order Butterworth filter having the desired step response, plus two more non-dominant poles placed on the abscissa axis relatively close to zero.

Now considering only the controllable states x1 and x2, the control law can be written as $$u(k) = -Kp \cdot \underline{xp}(k), \tag{14}$$

where $Kp = [K1, K2]$ and $$\underline{xp}(k) = \begin{bmatrix} x1(k) \\ x2(k) \end{bmatrix}.$$

Therefore, $$\underline{xp}(k+1) = Ap \cdot xp(k) - Bp \cdot Kp \cdot xp(k) \tag{15}$$

or, $$\underline{xp}(k+1) = (Ap - Bp \cdot Kp)xp(k) \tag{16}$$

It will be seen that equation (16) is a dual of the homogeneous part of equation (12). The coefficients K1, K2 making up Kp can accordingly be calculated by means of the above-mentioned software implementation of Ackermann's method, for example, using the two non-dominant poles used for calculating L. As a result, the entire system of the estimator 34 and control gain block 52 will be dominated by the estimator 34. It should be understood that a simulation of the system should be performed to assure that the transient behavior of the system does not exceed physical constraints on the system by, for example, saturating the power amplifier used for driving actuator 20. If simulation shows that such constraints would be exceeded, the controller portion can be "slowed down" by calculating new values of K1 and K2 on the basis of somewhat lower frequency poles. The simulations of system behavior and, if necessary, adjustment of poles used for calculating K1 and K2 are well within the capabilities of those having ordinary skill in the art, and so need not be further described.

Further details of the operation of the control system of FIG. 7 will be described with reference to FIG. 8, which illustrates a routine for controlling head position with repetitive runout compensation based on concurrently generated state parameters.

The first three steps of FIG. 8, steps 300, 302, 304, are similar to the steps 100, 102 and 104 of FIG. 5, and so will only be briefly described.

At step 300, initial estimated state values (e.g., zero) are stored for the estimated state vector $\bar{x}$. At step 302 an error signal e' is formed as a function of the difference between a sensed position signal y and an estimated position signal $\bar{y}$, and at step 304 the estimated state vector $\bar{x}$ is updated.

At step 306, which follows step 304, matrix multiplication calculations are performed to implement controller gain block 52, so that the command signal u is generated.

Finally, at step 308, the command signal u is applied as a control signal to actuator 20. The routine then continues as an endless loop through steps 302–308 as long as read/write operations are performed.

Although the "hybrid" runout compensation system described before with respect to FIGS. 2–6 provides satisfactory results, the real-time estimator technique just described with respect to FIGS. 7 and 8 carries additional advantages. Among these advantages are the elimination of some experimentation that is normally required in designing a compensator-based control system like that of FIGS. 2–6. Moreover, the estimator which is run in real time according to FIGS. 7 and 8 provides inherent filtering in the feedback loop so that trade-offs between resistance to noise and transient response can be conveniently made in the design of the estimator. In addition, a smoother transition from "seek" mode to "track following" mode is possible since an estimator and control law structure is used in both cases.

As in the hybrid compensator system of FIG. 4, a "seek" function is not explicitly shown in the real-time estimator system of FIG. 7, but seeking of a target track can be implemented by application of an appropriate reference signal upstream from controller gain vector block 52.

The above description of the invention is intended to be illustrative and not limiting. Various changes or modifications in the embodiments described may occur to those skilled in the art and these can be made without departing from the spirit or scope of the invention. For example, although the present invention has been described in the environment of a magnetic disk drive, it is equally applicable to an optical disk mass storage device.

What is claimed is:

1. In a data storage device including a rotary disk on which data is magnetically recorded in concentric circular tracks, a magnetic head for reading data from and writing data in said concentric tracks, and actuator means for moving said magnetic head on a path that crosses said concentric tracks, a method of controlling a position of said magnetic head to compensate for repetitive runout disturbances, comprising the steps of:

sensing a position of said magnetic head relative to one of said concentric tracks;

generating a sensed position signal indicative of said sensed position of said magnetic head;

storing estimated state signals including an estimated position signal, an estimated velocity signal, an estimated bias signal and first and second estimated runout parameter signals, said first estimated runout parameter signal being formed by integrating said second estimated runout parameter signal and said second estimated runout parameter being formed by integrating the product of said first estimated runout parameter and $-\omega_0^2$, where $\omega_0$ is the rotational frequency of the disk, said first estimated runout parameter representing an acceleration of said magnetic head relative to a respective one of said concentric tracks caused by a repetitive runout disturbance;

calculating an error signal as a function of said sensed position signal and said estimated position signal; and updating said stored estimated state signals as a function of said error signal and a signal representative of a control signal applied to said actuator means;

wherein said first and second estimated runout parameter signals vary sinusoidally at a frequency that is substantially the same as a frequency of rotation of said rotary disk.

2. A method according to claim 1; wherein said sensing, generating, calculating and updating steps are performed repeatedly and said repeated updating steps are performed in such a manner that said error signal is brought within a predetermined range.

3. A method according to claim 2; wherein said error signal is brought within said predetermined range during a time period that is substantially equal to a rotational period of said rotary disk.

4. A method according to claim 2; further comprising the steps of:

generating a time series of said first estimated runout parameter signal commencing at a time after said error signal has been brought within said predetermined range;

applying a scaling factor to each signal of said time series of said first estimated runout parameter signal to form scaled runout parameter signals;

storing said scaled runout parameter signals as runout table signals;

determining a rotational position of said rotary disk;

selecting one of said runout table signals as a function of said determined rotational position of said rotary disk;

generating a control signal as a function of said selected runout table signal; and applying said generated control signal to said actuator means such that said actuator means positions said magnetic head to compensate for said repetitive runout disturbance.

5. A method according to claim 1, wherein said sensing, generating, calculating and updating steps are performed repeatedly and said repeated updating steps are performed such that said error signal is brought substantially equal to zero.

6. A method according to claim 5, further comprising the steps of generating a time series of said first estimated runout parameter signal commencing at a time after said error signal has been brought within said predetermined range; applying a scaling factor to each signal of said time series of said first estimated runout parameter signal to form scaled runout parameter signals; storing said scaled runout parameter signals as runout table signals; determining a rotational position of said rotary disk; selecting one of said runout table signals on the basis of said determined rotational position of said rotary disk; generating a control signal on the basis of said selected runout table signal; and applying said generated control signal to said actuator means such that said actuator means positions said magnetic head to compensate for said repetitive runout disturbance.

7. A method according to claim 1; further comprising the steps of:

forming a control signal as a function of said updated estimated state signals; and applying said control signal to said actuator means such that said actuator means positions said magnetic head to compensate for said repetitive runout disturbance.

8. A method according to claim 7; wherein said sensing, generating, calculating and updating steps are performed repeatedly and said repeated updating steps are performed in such a manner that said error signal is brought within a predetermined range.

9. A method according to claim 8; wherein said error signal is brought within said predetermined range during a time period that is substantially shorter than a rotational period of said rotary disk.

10. A method according to claim 7, wherein said sensing, generating, calculating and updating steps are performed repeatedly and said repeated updating steps are performed such that said error signal is brought substantially equal to zero.

11. A method according to claim 1, wherein said step of updating said stored estimated state signals is defined by the relation:

$$\bar{x}(k+1) = A_e \bar{x}(k) + B_e \begin{bmatrix} u(k) \\ y(k) \end{bmatrix},$$

where $\bar{x}(k+1)$ represents a vector comprising updated estimated state signals; $\bar{x}(k)$ represents a vector comprising said stored estimated state signals; $u(k)$ represents said signal representative of a control signal applied to said actuator means; $y(k)$ represents said sensed position signal; $A_e = A - LC$; and $B_e = [B\ L]$; wherein A represents a system matrix, B represents an input gain vector, L represents an estimator gain vector, and C represents a transducer gain vector.

12. A method according to claim 11, wherein eigenvalues of $A_e$ comprise poles of an estimator and said poles are selected to provide a desired transient performance of said estimator.

13. A method according to claim 12, wherein said poles are selected such that a step response of said estimator settles to within a predetermined value during a time period that is substantially equal to a rotational period of said rotary disk.

14. A method according to claim 12, wherein said poles correspond to a Butterworth filter having a step response conforming with said desired transient performance of said estimator.

15. Data storage apparatus comprising:
a rotary disk on which data is magnetically recorded in concentric circular tracks;
magnetic head means for reading data from and writing data in said concentric tracks;
actuator means for moving said magnetic head means on a path that crosses said concentric tracks; and
control means for receiving track following signals picked up by said magnetic head means from said rotary disk and for applying control signals to said actuator means so that positioning of said magnetic head is controlled to compensate for repetitive runout disturbances; said control means including a processor and a memory associated with said processor; said processor being programmed to:
generate as a function of said received track following signals a sensed position signal indicative of a position of said magnetic head relative to one of said concentric tracks;
store in said memory estimated state signals including an estimated position signal, an estimated velocity signal, an estimated bias signal and first and second estimated runout parameter signals, said first estimated runout parameter signal being formed by integrating said second estimated runout parameter signal and said second estimated runout parameter being formed by integrating the product of said first estimated runout parameter and $-\omega_0^2$, where $\omega_0$ is the rotational frequency of the disk, said first estimated runout parameter representing an acceleration of said magnetic head relative to a respective one of said concentric tracks caused by a repetitive runout disturbance;
calculate an error signal as a function of said sensed position signal and said estimated position signal; and
update said stored estimated state signals as a function of said error signal and a signal representative of a control signal applied by said control means to said actuator means; said first and second estimated runout parameter signals varying sinusoidally at a frequency that is substantially the same as a frequency of rotation of said rotary disk.

16. Data storage apparatus according to claim 15; wherein said processor repeatedly generates said sensed position signal, calculates said error signal, and updates said stored estimated state signals in such a manner that said error signal is brought within a predetermined range.

17. Data storage apparatus according to claim 16; wherein said error signal is brought within said predetermined range during a time period that is substantially equal to a rotational period of said rotary disk.

18. Data storage apparatus according to claim 16; wherein said processor is also programmed to:
generate a time series of said first estimated runout parameter signal commencing at a time after said error signal has been brought within said predetermined range;
apply a scaling factor to each signal of said time series of said first estimated runout parameter signal to form scaled runout parameter signals; and
store said scaled runout parameter signals in said memory as runout table signals;
said control means detecting a frame signal stored on said rotary disk and representative of a rotational position of said disk, reading out one of said runout table signals from said memory as a function of said detected frame signal, generating a control signal as a function of said read out runout table signal and applying said generated control signal to said actuator means such that said actuator means positions said magnetic head to compensate for said repetitive runout disturbance.

19. Data storage apparatus according to claim 15, wherein said processor repeatedly generates said sensed position signal, calculates said error signal, and updates said stored estimated state signals such that said error signal is brought substantially equal to zero.

20. Data storage apparatus according to claim 19, wherein said processor is also programmed to generate a time series of said first estimated runout parameter signal commencing at a time after said error signal has been brought within said predetermined range; apply a scaling factor to each signal of said time series of said first estimated runout parameter signal to form scaled runout parameter signals; and store said scaled runout parameter signals in said memory as runout table signals; said control means detecting a frame signal stored on said rotary disk and representative of a rotational position of said disk, reading out one of said runout table signals from said memory on the basis of said detected frame signal, generating a control signal on the basis of said read out runout table signal and applying said generated control signal to said actuator means such that said actuator means positions said magnetic head to compensate for said repetitive runout disturbance.

21. Data storage apparatus according to claim 15; wherein said control means generates a control signal as a function of said updated estimated state signals and applies said generated control signal to said actuator means such that said actuator means positions said magnetic head to compensate for said repetitive runout disturbance.

22. Data storage apparatus according to claim 21; wherein said processor repeatedly generates said sensed position signal, calculates said error signal, and updates said stored estimated state signals in such a manner that said error signal is brought within a predetermined range.

23. Data storage apparatus according to claim 22; wherein said error signal is brought within said predetermined range during a time period that is substantially shorter than a rotational period of said rotary disk.

24. Data storage apparatus according to claim 21, wherein said processor repeatedly generates said sensed position signal, calculates said error signal, and updates said stored estimated state signals such that said error signal is brought substantially equal to zero.

25. Data storage apparatus according to claim 15, wherein said processor updates said stored estimated state signals by the relation:

$$\bar{x}(k+1) = A_e\bar{x}(k) + B_e\begin{bmatrix}u(k)\\y(k)\end{bmatrix},$$

where $\bar{x}(k+1)$ represents a vector comprising updated estimated state signals; $\bar{x}(k)$ represents a vector comprising said stored estimated state signals; $u(k)$ represents said signal representative of a control signal applied to said actuator means; $y(k)$ represents said sensed position signal; $A_e = A - LC$; and $B_e = [B\ L]$; wherein A represents a system matrix, B represents an input gain vector, L represents an estimator gain vector, and C represents a transducer gain vector.

26. Data storage apparatus according to claim 25, wherein eigenvalues of $A_e$ comprise poles of an estimator and said poles are selected to provide a desired transient performance of said estimator.

27. Data storage apparatus according to claim 26, wherein said poles are selected such that a step response of said estimator settles to within a predetermined value during a time period that is substantially equal to a rotational period of said rotary disk.

28. Data storage apparatus according to claim 26, wherein said poles correspond to a Butterworth filter having a step response conforming with said desired transient performance of said estimator.

29. Data storage apparatus comprising:
a physical plant including a rotary disk on which data is recorded in concentric circular tracks, a head for reading data from said concentric tracks, and an actuator for moving said head on a path that crosses said concentric tracks; and
a control system for receiving track following signals picked up by said head from said rotary disk and for applying control signals to said actuator to control positioning of said head; said control system including a processor and a memory associated with said processor; said processor being programmed to:
generate as a function of said received track following signals a sensed position signal indicative of a position of said head relative to one of said concentric tracks;
store in said memory estimated state signals representative of estimated conditions of said physical plant including an estimated position signal and first and second estimated runout parameter signals, said first estimated runout parameter signal being formed by integrating said second estimated runout parameter signal and said second estimated runout parameter being formed by integrating the product of said first estimated runout parameter and $-\omega_0^2$, where $\omega_0$ is the rotational frequency of the disk, said first estimated runout parameter representing an acceleration of said magnetic head relative to a respective one of said concentric tracks caused by a repetitive runout disturbance;
calculate an error signal as a function of said sensed position signal and said estimated position signal;
update said stored estimated state signals as a function of said error signal and a signal representative of a control signal applied by said control system to said actuator; and
form said control signal as a function of said updated estimated state signals.

30. Data storage apparatus according to claim 29; wherein said first and second estimated runout parameter signals vary sinusoidally at a frequency that is substantially the same as a frequency of rotation of said rotary disk.

31. Data storage apparatus according to claim 29; wherein said first estimated runout parameter signal has an amplitude and a phase that are representative of said acceleration of said magnetic head.

32. Data storage apparatus according to claim 31; wherein said estimated state signals include an estimated velocity signal and an estimated bias signal.

* * * * *